US005667687A

United States Patent [19]

Lange

[11] Patent Number: 5,667,687

[45] Date of Patent: Sep. 16, 1997

[54] CYCLONE

[75] Inventor: Neville E. Lange, Gloucester, England

[73] Assignee: Serck Baker Limited, Wimbourne, England

[21] Appl. No.: 574,018

[22] Filed: Dec. 18, 1995

[30] Foreign Application Priority Data

Dec. 23, 1994 [GB] United Kingdom .................... 9426149

[51] Int. Cl.[6] ........................................ B01D 21/26

[52] U.S. Cl. ........................ 210/512.2; 210/512.1; 210/97; 210/108; 209/721; 209/732

[58] Field of Search ........................ 210/512.1, 512.2, 210/97, 108; 209/715, 720, 721, 725, 726, 728, 732, 733

[56] References Cited

U.S. PATENT DOCUMENTS

| | | | |
|---|---|---|---|
| 3,417,871 | 12/1968 | Arnold | 210/812.1 |
| 4,148,723 | 4/1979 | Mozley | 210/512.1 |
| 4,356,084 | 10/1982 | Hatton et al. . | |
| 5,173,177 | 12/1992 | Greenwood et al. . | |
| 5,478,484 | 12/1995 | Michaluk | 210/788 |

*Primary Examiner*—David A. Reifsnyder
*Attorney, Agent, or Firm*—Nixon & Vanderhye P.C.

[57] ABSTRACT

A cyclone having a deblocking device comprising a rod relatively moveable into or out of an orifice to dislodge any solid matter therein. The rod may be provided with a formation to enhance the dislodgement.

12 Claims, 3 Drawing Sheets

CYCLONE

BACKGROUND OF THE INVENTION

1. Field of the Invention

This invention relates to a cyclone having a deblocking device.

2. Discussion of Prior Art

It is known to use cyclone separators in the offshore oil industry for separating oil and water. However, the mixtures to be separated sometimes contain solid material e.g. mud, sand or organic material, and this can block the outlets of the separator(s). Since a large number of cyclone separators are used, arranged in series or in parallel in larger vessels, it is difficult to identify and isolate the particular outlet in which the blockage has occurred.

Hydrocyclones in this type of application have conventionally been "backwashed" by admitting the inter pressure to the overflow chamber of the pressure vessel, thereby causing a reversal of the direction of flow through the overflow orifice. This has the limitation that the maximum pressure differential that can be developed over a blocked orifice is equal to the pressure drop caused by the reverse flow through the other unblocked or partially blocked orifices. A large reverse flow and prolonged "backwashing" may therefore be required to produce any beneficial effect on blocked or partially blocked orifices. Additionally the purpose of the hydrocyclones is to remove residual oil from the produced water to meet legislative requirements for discharge, and any reverse flow carries back onto the hydrocyclone quantities of the separated oil and prevents the hydrocyclone from removing any oil from the incoming flow. This is clearly undesirable because the quality of the water leaving the underflow of the cyclone may become worse than the water entering the cyclone.

SUMMARY OF THE INVENTION

It is an object of the present invention to overcome or tend to overcome these disadvantages.

In accordance with the invention a cyclone has a deblocking device and an orifice, the device comprising a rod supported normally in a position away from said orifice, but relatively movable into said orifice to dislodge any solid matter therein, on change of pressure downstream of the orifice. Usually the said orifice is the overflow outlet of the cyclone, but may be the underflow outlet, particularly if the cyclone is used to separate solids from liquid.

The cyclone may be one of a plurality of cyclones mounted in a vessel which has internal walls supporting the cyclones and dividing the vessel into an inlet chamber, an overflow chamber and an underflow chamber. The cyclone may be arranged in a parallel or a radial array.

Preferably the rod is relatively movable when the pressure in the overflow chamber of the vessel is made equal to the pressure in the inlet chamber.

The rod may be kept stationary and the cyclone movable e.g. in a direction parallel to the longitudinal axis thereof, but alternatively the cyclone may be stationary and the rod movable. The rod may be provided with a formation e.g. a helical groove with edges to provide a scraping action on relative motion.

In accordance with the invention also a cyclone has a piston and an orifice, the piston supported normally in a position away from the orifice but relatively movable towards said orifice to reduce the flow rate through the orifice.

BRIEF DESCRIPTION OF THE DRAWINGS

One embodiment of the invention will now be described by way of example only, with reference to the accompanying drawings of which.

DETAILED DISCUSSION OF PREFERRED EMBODIMENTS

Figure 1:
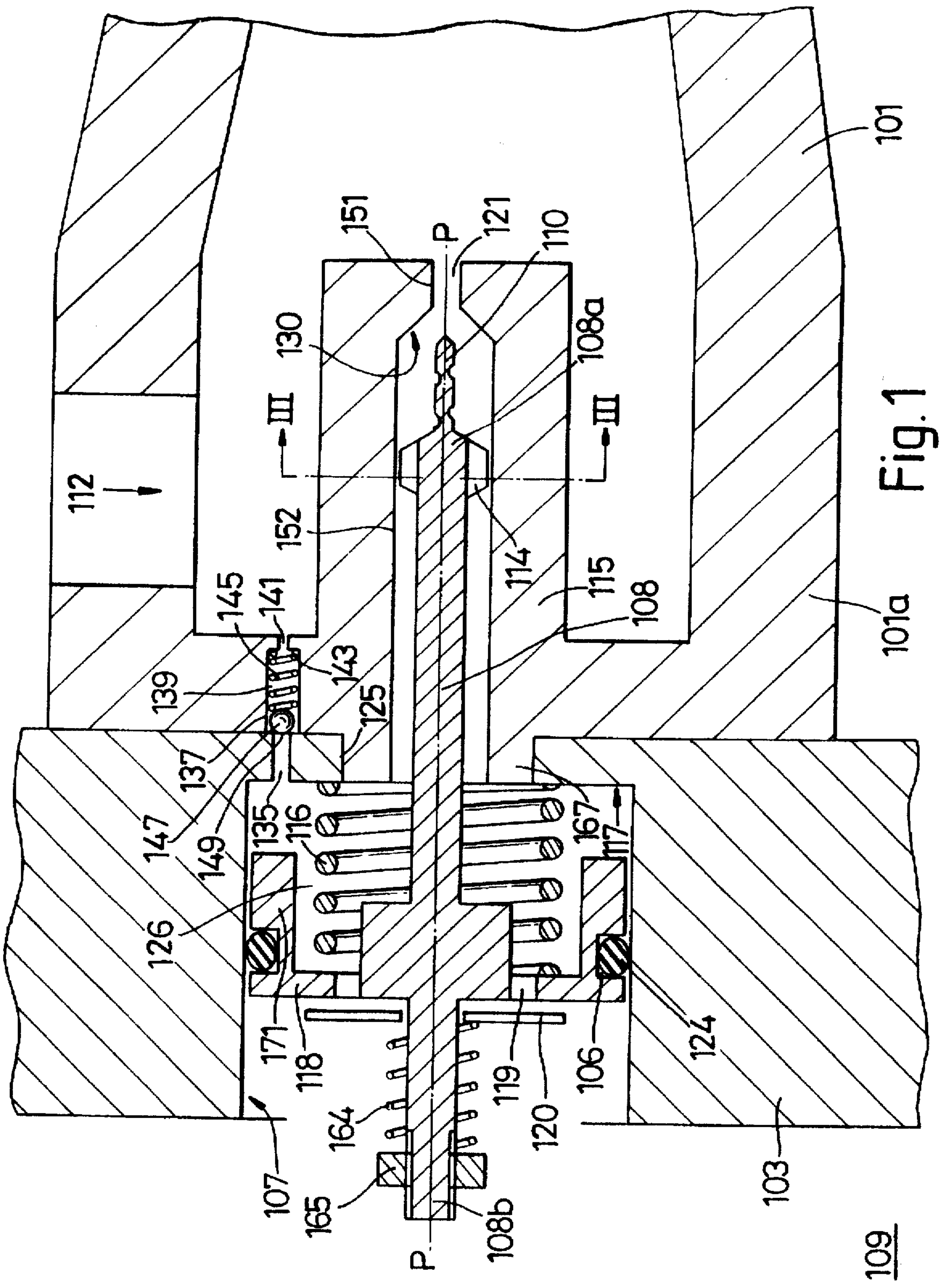
FIG. 1 shows a partial longitudinal cross-section through the wide end of a cyclone, the cyclone having a deblocking device.
Figure 2:
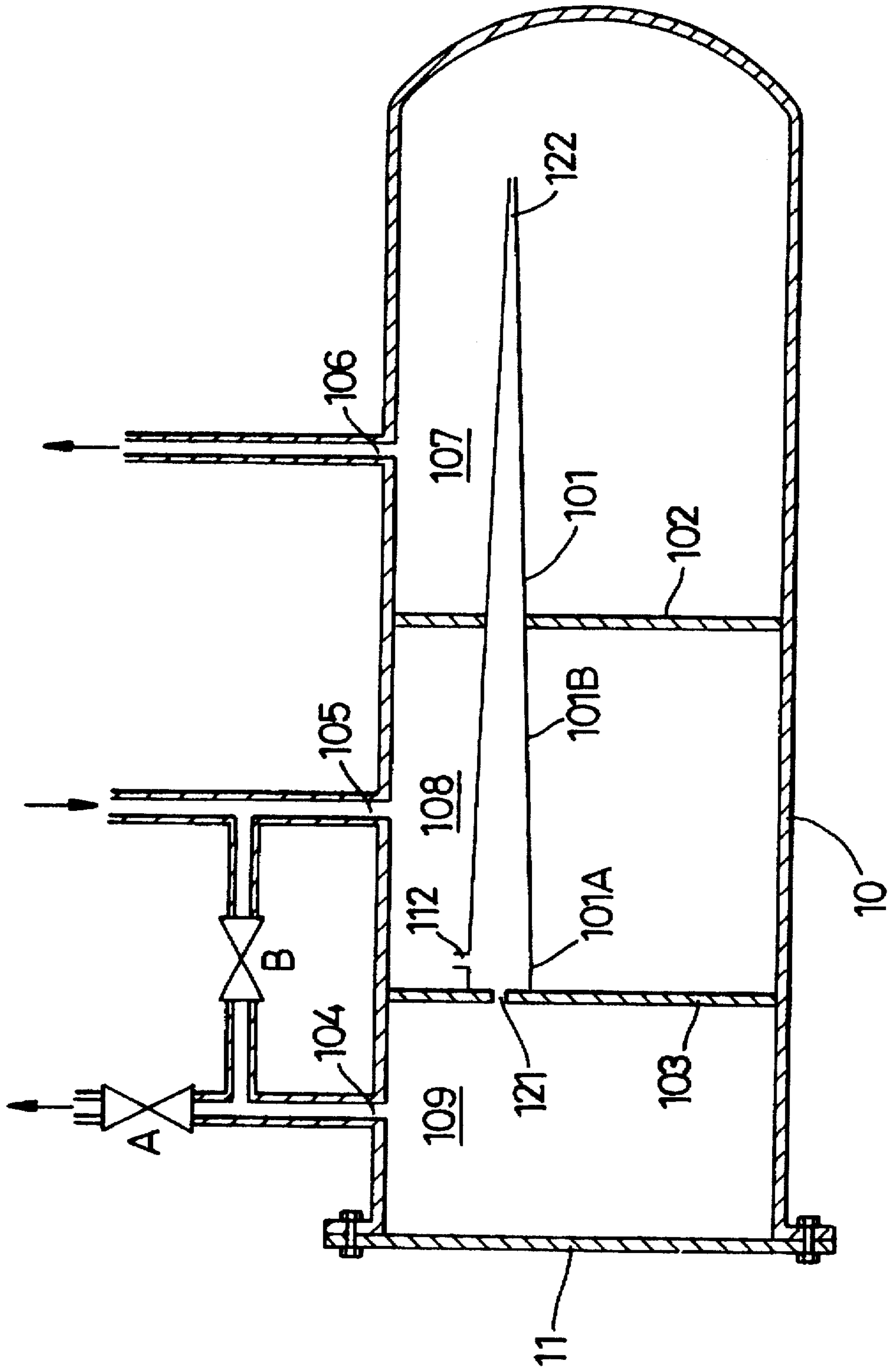
FIG. 2 shows diagrammatically a longitudinal cross-section through a pressure vessel containing a plurality of cyclones (only one shown), each in accordance with the invention.

A cyclone in accordance with the invention is shown in FIG. 1 and as shown in FIG. 2, is located with a plurality of similar cyclones in parallel in a pressure vessel 10 closed by an end plate 11. A plurality of cyclones is supported in parallel on the vessel, each cyclone having a cylindrical portion 101A and a tapered portion 101B. Only one cyclone is shown for clarity.

The cyclone 101 is supported in the vessel 10 by two walls in the form of tube plates 102 and 103, which divide the interior of the vessel to form three chambers: an inlet chamber 108 into which a mixture of oil and water to be separated enters via a vessel inlet 105, an underflow chamber 107 from which water and a smaller proportion of oil than in the mixture fed through the inlet exits via a vessel underflow outlet 106 and an overflow chamber 109 from which water and a larger proportion of oil exits via a vessel overflow outlet 104. In this embodiment the cyclone 101 has one inlet port 112, tangentially disposed in the cylindrical portion 101A, (although more than one inlet port may be provided), an underflow port 122 at the end of the tapered portion 101B and an overflow port 121, each of which opens into the inlet chamber 108, the underflow chamber 107 and the overflow chamber 109 respectively.

Backwashing means comprising valves A and B and associated pipework is provided. Valve A is provided in the outlet pipework attached to the overflow outlet 104 and a valve B is provided in pipework connecting the said outlet pipework and the inlet pipework attached to the inlet 105.

As shown in FIG. 1 the cyclone 101 is fixed to the tube plate 103 and is not movable axially. The overflow port 121 is formed in a tube 115 which extends into the interior of the cyclone 101 along the axis P—P thereof. The tube 115 has a portion 151 of reduced internal diameter at its inner extremity and a frusto-conical surface 130 between the reduced diameter portion 151 and the remainder 152 of the interior thereof.

The overflow port 121 extends through a boss 167 formed at the end of the cyclone 101. The boss seats in a hole 125 formed in the tube plate 103. The port extends into the bore of a cylindrical recess 126 in the tube plate 103. Positioned in the recess is a piston 171, sealingly engaged by means of an O-ring piston seal 124 in a groove 106 against the interior wall 107 of the recess 126. The piston 171 has a rod 108 fixed or integrally formed therewith on the axis P—P of the cyclone, one end 108A of which extends towards the overflow port 121 in the tube and the other end 108B extends into the overflow chamber 109 of the vessel 10.

Located in the tube plate alongside the hole 125 is a smaller diameter hole 135 which leads into a larger diameter section 137 of a passage 139 leading into the cyclone 101. The passage 139 has a smaller diameter section 141 and at the junction of the two sections 137 and 141 is a shoulder 143 for supporting a helical spring 145 which urges a ball 147 against the end of the smaller diameter hole 135. The ball 147 and spring 145 constitute a one-way valve 149 between the recess 126 and the interior of the cyclone 101. The end of the smaller diameter hole 135 acts as a valve seat.

The one end 108A lies adjacent to the frusto-conical surface 130 inside the tube 115 and is provided with a narrow projection 110 and a plurality of fins 114 which extend radially outwards from the rod 108 and help to ensure that the rod is positioned on the axis P—P of the tube 115. The other end of the rod is provided with a flange 165.

Figure 3:
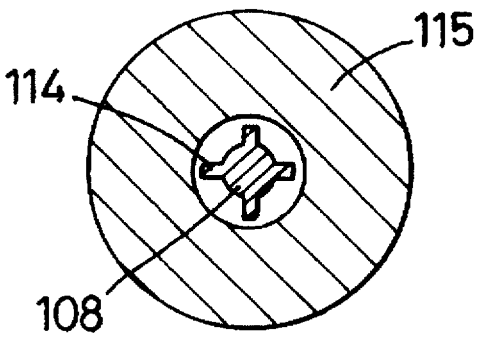
FIG. 3 shows a cross-section on line III—III of FIG. 1.
Figure 4:
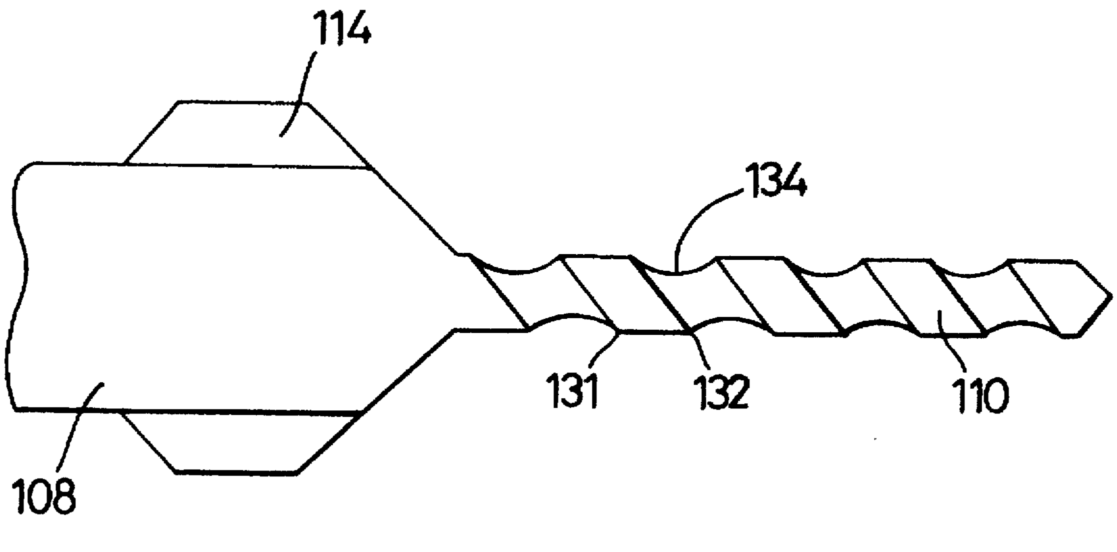
FIG. 4 shows an enlarged side view of part of the rod of the deblocking device

The narrow projection 110 is provided with a helical groove 134 extending along the whole of the length thereof. The projection thus has the configuration of a drill bit as can be seen in FIG. 3.

The groove 134 has edges 131 and 132 which enhance the dislodgement of any solid matter in the orifices by providing a scraping action in operation as described later. The configuration also reduces the chance of the projection 110 sealing in the orifice 121.

A spring 116 is provided between the base 117 of the recess and the piston head 118 in which are formed a plurality of holes 119. These holes are covered by a plate 120 which is held against the piston head 118 by a further coil spring 164 surrounding the tube and pressing at one end against the plate 120 and at the other against the flange 165.

During normal operation valve B is closed and valve A is open. The pressure is greater inside the cyclone and a separated component i.e. an oil rich mixture of oil and water, passes out through the overflow port 121, past the fins 114 and into the recess 126. The mixture then passes through the holes 119 in the piston head 118, moves the plate 120 to the left (as shown in FIG. 1) against the forced spring 164 and passes into the overflow chamber 109.

To cause a backwash valve A is closed and valve B is opened. Thus liquid at inlet pressure is admitted to the overflow chamber while the cyclone is in otherwise normal operation. This would tend to cause a reverse flow through the overflow orifice 121, because the pressure at the core of the cyclone is lower than the inlet pressure. The plate 120 covers the holes 119 in the manner of a check valve preventing any reverse flow of fluid through the piston 171 and the pressure difference across the piston causes it to move to the right as shown in FIG. 1 which will push the projection 110 through the overflow orifice 121 thereby dislodging any solid matter therein, the edges of the groove providing the scraping action referred to above. Liquid displaced by the piston when it moves to The right passes out through the overflow orifice or through the one-way valve 149.

One benefit of this construction is that a large force is generated by the piston 171 and a physical scraping action is produced by the projection aiding in more effective cleaning of the orifice than is possible with conventional backwashing, which uses only a reverse flow of water to cause cleaning. A second benefit is that all cyclones wilt receive an equal cleaning action, and a third benefit is that the quantity of liquid pushed back into the cyclone from the overflow chamber is equal only to the volume displaced by the motion of the piston 171.

When backwashing is completed valve B is closed and valve A is opened so the inlet pressure is disconnected from the overflow chamber. The spring 116 returns the piston 171 to its left hand position withdrawing the projection 110 from the orifice 121, allowing the cyclone to resume normal operation.

In a modification of the invention described, the forward part of the rod 108 and projection 110 and one-way valve 149 may be omitted i.e. leaving the piston 171, spring 1126, plate 120, spring 164 and flange 165 on the rear part of the rod 108. Thus the device serves to limit the volume of water reverse flowed through each orifice to the volume displaced by the piston, thus overcoming only one disadvantage of the conventional backwash.

I claim:

1. A cyclone having a deblocking device and an orifice, the deblocking device comprising a rod and piston means attached to the rod, and a spring means for biasing the rod, the rod supported in normal operation of the cyclone in a position away from said orifice, the rod and the cyclone being movable relative to one another for movement into and away from said orifice to dislodge any solid matter in the orifice, in response to said spring bias and a change of pressure acting on the piston means.

2. A cyclone according to claim 1 wherein the orifice is the overflow outlet of the cyclone.

3. A cyclone according to claim 1 wherein the rod is kept stationary and the cyclone is moveable relative to said rod.

4. A cyclone according to claim 1 wherein the rod is movable and the cyclone is stationary relative to said rod.

5. A cyclone according to claim 1 wherein the rod is provided with a formation.

6. A cyclone according to claim 5 wherein the formation comprises a helical groove with edges.

7. A vessel containing a plurality of cyclones each according to claim 1, the vessel having internal walls which support the cyclone and divide the vessel into an inlet chamber, an overflow chamber and an underflow chamber.

8. A vessel according to claim 7 wherein the relative movement between the rod and the cyclone occur when the pressure in the overflow chamber is made equal to the pressure in the inlet chamber.

9. A vessel according to claim 7, comprising backwash means.

10. A vessel according to claim 7 wherein each cyclone has an interior and the vessel comprises a one way valve in a passage connecting the interior of a cyclone to the overflow chamber.

11. A cyclone having a deblocking device and an orifice, the deblocking device comprising a moveable rod and a spring means which supports the rod in a position away from the orifice in normal operation of the cyclone, the rod moveable into and out of said orifice to dislodge any solid matter in the orifice on change of pressure of fluid flowing through the cyclone downstream of said orifice.

12. A cyclone separator having an inlet chamber into which a mixture of fluids to be separated enters, an underflow chamber from which relatively heavier materials exit the separator, and an overflow chamber from which relatively lighter materials exit the separator, said separator including backwashing means for applying said mixture to be separated momentarily to said overflow chamber in order to backwash a nozzle opening between said inlet chamber portion of said separator and said overflow chamber, said improvement comprising:

a rod mounted for movement into and away from said nozzle opening between said inlet chamber and said overflow chamber;

spring means for biasing said rod away from said nozzle opening; and piston means for moving said rod into said nozzle opening when pressure in said overflow chamber is greater than pressure in said inlet chamber.

* * * * *

UNITED STATES PATENT AND TRADEMARK OFFICE

CERTIFICATE OF CORRECTION

PATENT NO. : 5,667,687
DATED : September 16, 1997
INVENTOR(S) : LANGE

It is certified that error appears in the above-identified patent and that said Letters Patent is hereby corrected as shown below:

Column 1, line 18, "inter" should read --inlet--.

Column 1, line 30, "onto" should read --into--.

Column 1, line 52, "cyclone" should read --cyclones--.

Column 3, line 31, "forced" should read --further--.

Column 3, line 45, "The" should read --the--.

Column 3, line 53, "wilt" should read --will--.

Column 4, line 1, "1126" should read --116--.

Signed and Sealed this

Ninth Day of December, 1997

Attest:

BRUCE LEHMAN

*Attesting Officer* *Commissioner of Patents and Trademarks*